(12) United States Patent
Lv et al.

(10) Patent No.: US 10,795,615 B2
(45) Date of Patent: Oct. 6, 2020

(54) METHOD AND DEVICE FOR STORAGE MANAGEMENT IN A HIERARCHICAL STORAGE SYSTEM

(71) Applicant: EMC IP Holding Company LLC, Hopkinton, MA (US)

(72) Inventors: Shuo Lv, Beijing (CN); Wilson Hu, Beijing (CN); Bean Zhao, Tianjin (CN); Chao Han, Beijing (CN); Eileen Gu, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 4 days.

(21) Appl. No.: 15/711,107

(22) Filed: Sep. 21, 2017

(65) Prior Publication Data

US 2018/0088870 A1    Mar. 29, 2018

(30) Foreign Application Priority Data

Sep. 23, 2016 (CN) .......................... 2016 1 0847721

(51) Int. Cl.
*G06F 3/06* (2006.01)
*G06F 16/30* (2019.01)
*G06F 16/11* (2019.01)
*G06F 16/185* (2019.01)

(52) U.S. Cl.
CPC .......... *G06F 3/0685* (2013.01); *G06F 3/0605* (2013.01); *G06F 3/0643* (2013.01); *G06F 3/0649* (2013.01); *G06F 16/119* (2019.01); *G06F 16/185* (2019.01)

(58) Field of Classification Search
CPC .... G06F 3/0649; G06F 16/119; G06F 16/185; G06F 3/0605; G06F 3/0643; G06F 3/0685; G06F 16/30
USPC ........ 711/162, E12.103, 100, 165, 170, 117; 1/1
See application file for complete search history.

(56) References Cited

U.S. PATENT DOCUMENTS

| 7,684,417 | B2 * | 3/2010 | Imai ..................... G06F 11/2025 370/400 |
| 9,256,542 | B1 * | 2/2016 | Flower ................ G06F 12/0866 |
| 9,258,364 | B2 * | 2/2016 | Carr ....................... G06F 3/0605 |
| 2007/0033340 | A1 * | 2/2007 | Tulskie ................. G06F 3/0649 711/108 |
| 2012/0042124 | A1 * | 2/2012 | Miyamoto ............ G06F 3/0605 711/114 |

(Continued)

*Primary Examiner* — Tuan V Thai
*Assistant Examiner* — Edward Waddy, Jr.
(74) *Attorney, Agent, or Firm* — Brian J. Colandreo; Mark H. Whittenberger; Holland & Knight LLP

(57) ABSTRACT

Embodiments of the present disclosure provide a storage management method and device. The method comprises: obtaining an attribute and access information of a file stored in storage at a first level in a hierarchical storage system, the attribute of the file indicating a size of the file, and the access information indicating an access frequency of the file; determining necessity of migrating the file based on the attribute of the file and the access information; and in response to the necessity exceeding a predetermined threshold, migrating the file to storage at a second level in the hierarchical storage system, the second level being different from the first level. Embodiments of the present disclosure further disclose a corresponding device.

18 Claims, 4 Drawing Sheets

(56) References Cited

U.S. PATENT DOCUMENTS

| | | | |
|---|---|---|---|
| 2013/0024634 A1* | 1/2013 | Shitomi | G06F 3/061 |
| | | | 711/162 |
| 2014/0108759 A1* | 4/2014 | Iwamitsu | G06F 3/0604 |
| | | | 711/165 |
| 2014/0298338 A1* | 10/2014 | Doi | G06F 9/4856 |
| | | | 718/1 |
| 2016/0132433 A1* | 5/2016 | Hayashi | G06F 12/0866 |
| | | | 711/118 |
| 2017/0212845 A1* | 7/2017 | Conway | G06F 3/0653 |
| 2017/0308316 A1* | 10/2017 | Yamamoto | G06F 3/0664 |

* cited by examiner ness of migrating the file based on the attribute of the file and the access information; and in response to the necessity exceeding a predetermined threshold, migrate the file to storage at a second level in the hierarchical storage system, the second level being different from the first level.

METHOD AND DEVICE FOR STORAGE MANAGEMENT IN A HIERARCHICAL STORAGE SYSTEM

RELATED APPLICATIONS

This application claim priority from Chinese Patent Application Number CN201610847721.5, filed on Sep. 23, 2016 at the State Intellectual Property Office, China, titled "METHOD AND DEVICE FOR STORAGE MANAGEMENT" the contents of which is herein incorporated by reference in its entirety.

FIELD

Embodiments of the present disclosure generally relate to storage management, and more specifically, to a method and device for storage management in a hierarchical storage system.

BACKGROUND

Currently, in a hierarchical storage system, files are often migrated between storage with a higher speed at a higher level and storage with a lower speed at a lower level, so that files of a higher priority and files that are determined to be frequently accessed are stored in the storage at the higher level, while files of a lower priority and files that are determined to be less frequently accessed are stored in the storage at the lower level, in order to improve a hit rate of accessing files in the storage at the higher level, and thereby increasing speed of accessing the files. However, the conventional file migration scheme is so arbitrary that too much unnecessary file migration is incurred or files need to be accessed fail to be migrated to the storage at the higher level, and thus degrading the performance of the hierarchical storage system and increasing costs of the hierarchical storage system.

SUMMARY

In general, embodiments of the present disclosure provide an optimized storage management solution by improving the way of migrating files in the hierarchical storage system.

According to a first aspect of the present disclosure, there is provided a storage management method, the method comprises: obtaining an attribute and access information of a file stored in storage at a first level in a hierarchical storage system, the attribute of the file indicating a size of the file, and the access information indicating an access frequency of the file; determining necessity of migrating the file based on the attribute of the file and the access information; and in response to the necessity exceeding a predetermined threshold, migrating the file to storage at a second level in the hierarchical storage system, the second level being different from the first level.

In some embodiments, the access information further indicates at least one of: a time point when the file is most recently accessed, a time point when the file is most recently modified, the number of users accessing the file, and the number of times of access to the file.

In some embodiments, determining necessity of migrating the file comprises: determining a type of the file from the attribute of the file; and determining the necessity of migrating the file further based on the type of the file.

In some embodiments, migrating the file comprises: determining, based on the necessity of migrating the file and a predetermined threshold for storage at a different level, the storage at the second level to which the file is to be migrated.

In some embodiments, migrating the file comprises: determining, based on the necessity of migrating the file, a rank of the file among a plurality of files stored in the hierarchical storage system; and determining, based on the rank, the storage at the second level to which the file is to be migrated.

In some embodiments, obtaining an attribute and access information of a file comprises: determining a frequency of access to the hierarchical storage system; determining a time interval based on the frequency of the access; and obtaining the attribute of the file and the access information based on the time interval.

According to a second aspect of the present disclosure, there is provided an electronic device, the device comprises: at least one processing unit; and at least one memory coupled to the at least one processing unit and storing machine-executable instructions. The instructions, when executed by the at least one processing unit, cause the at least one processing unit to be configured to: obtain an attribute and access information of a file stored in storage at a first level in a hierarchical storage system, the attribute of the file indicating a size of the file, and the access information indicating an access frequency of the file; determine necessity of migrating the file based on the attribute of the file and the access information; and in response to the necessity exceeding a predetermined threshold, migrate the file to storage at a second level in the hierarchical storage system, the second level being different from the first level.

BRIEF DESCRIPTION OF THE DRAWINGS

Through the following detailed description with reference to the accompanying drawings, the above and other features, advantages and aspects of embodiments of the present disclosure will become more apparent. Throughout the drawings, the same or similar reference signs refer to the same or similar elements, in which.

DETAILED DESCRIPTION

Figure 1:
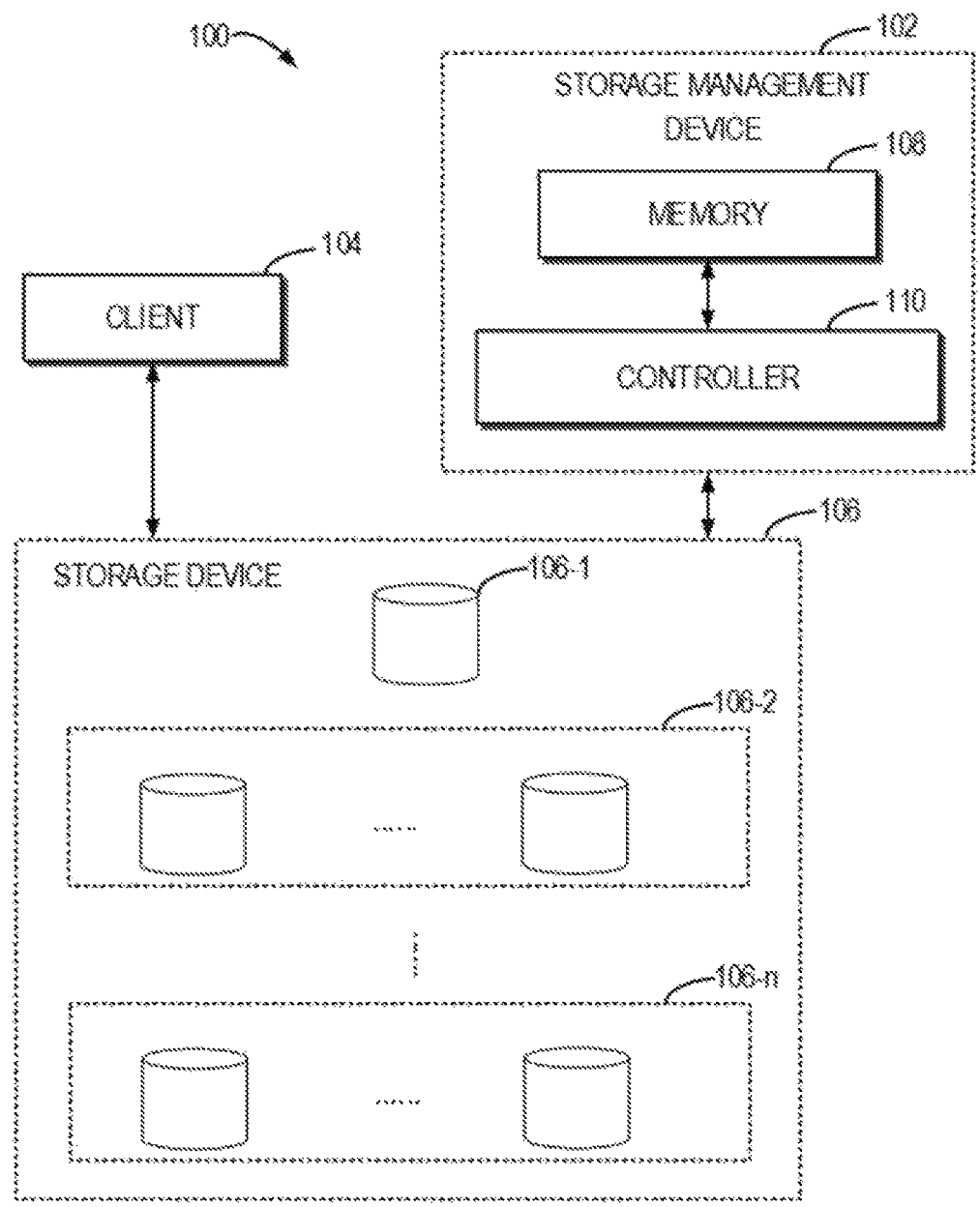
FIG. 1 illustrates a diagram of a storage environment in which embodiments of the present disclosure can be implemented.

Preferred embodiments of the present disclosure will be described in more detail with reference to the drawings. Although the drawings present the preferred embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "an example embodiment" are to be read as "at least one example embodiment." The term "a further embodiment" is to be read as "at least one further embodiment." The terms "first" and "second" and so on can represent different or identical objects. Other explicit and implicit definitions may be included in the following text.

As described above, the hierarchical storage system may include storage at different levels, in which storage at a higher level may have smaller storage capacity and higher access speed, while storage at a lower level may have larger storage capacity and lower access speed. In comparison with the storage at the lower level, the storage at the higher level has smaller capacity and is generally expensive. Therefore, it is expected that storage space of the storage at the higher level can be fully utilized to avoid unnecessary occupation of the storage space, so as to improve performance of the hierarchical storage system and save costs.

The conventional storage management technology adopts a data migration scheme to manage the hierarchical storage system. The conventional data migration allocates data stored in storage at respective levels solely based on a file attribute of file access time. Specifically, when the hierarchical storage system has storage of two levels, the hierarchical storage system migrates a file to storage at a first level in response to the file being written or modified. The hierarchical storage system further migrates the file to storage at a second level in response to a given period of time having elapsed since the last time for accessing the file.

However, such storage management technology is problematic. Firstly, the above data migration scheme fails to react flexibly to special migration cases. For instance, in the case of writing little data (for example 8 KB) in a large file (for example 2 GB) stored in the storage at the lower level, the whole file will be migrated to the storage at the higher level, and it is very likely that there is no further access to that file, which will cause substantial resource consumption in the storage system.

Secondly, factors taken into account by the above data migration scheme are too limited. The conventional scheme of migrating a file from the storage at the lower level to the storage at the higher level only takes file modification time into account. When a file in a primary storage is not modified but read frequently, the file will be migrated from the primary storage to the storage at the lower level. However, as a matter of fact, such migration is unnecessary.

Furthermore, in the conventional scheme, a file stored in the storage at the higher level is migrated to the storage at the lower level solely based on latest file access time, which causes too much file migration.

To at least in part solve the above-mentioned and other potential problems, embodiments of the present disclosure provide an optimized storage management solution by improving the way of migrating files in the hierarchical storage system. According to the embodiments of the present disclosure, whether to migrate a file between storage at different levels can be precisely determined based on factors such as file size, access frequency and the like, so as to improve a hit rate of accessing files in storage at a higher level while reducing workloads of the hierarchical storage system.

FIG. 1 illustrates a storage environment 100 in which embodiments of the present disclosure can be implemented. As shown, the storage environment 100 includes a storage management device 102, one or more clients 104 and a storage device 106. The client 104, which can be a Network Access Service (NAS) client or any suitable electronic device, can access (such as write or read) or modify data stored in the storage device 106 or perform other operations. The storage management device 102, the client 104 and the storage device 106 can be connected through hard wires such as PCI-E bus, and can also communicate via communication protocols such as Network File System (NFS), Common Internet File System (CIFS) or Hyper Text Transfer Protocol (HTTP).

The storage device 106 may include storage 106-1 to 106-n at one or more levels. The storage 106-1 to 106-n at each level may include one or more storage file servers. The storage 106-1 to 106-n included in the storage device 106 may be centralized or distributed. When the storage 106-1 to 106-n is distributed, the storage file servers included in the storage 106-1 to 106-n can transmit data through hard wires such as PCI-E bus, or via communication protocols such as NFS, CIFS, HTTP and TCP/IP over the network (such as the Internet). In FIG. 1, a storage file server at a first level (or referred to as primary storage file server) is shown. In fact, storage at each level may include any number of storage file servers. The storage file servers included in storage 106 can be, for instance, information archive servers, magnetic/optical servers, or the like.

Examples of physical storage include, but are not limited to: Solid State Disk (SSD), Fiber Channel (FC) disk, Serial Advanced Technology Attachment (SATA) disk, Serial Attached Small Computer System Interface (SAS) disk, or the like. In some embodiments, the storage 106-1 to 106-n can be configured as Redundant Array of Independent Disks (RAID).

In the storage 106-1 to 106-n, storage at different levels may have different access speed or capacity. For instance, the storage 106-1 or 106-2 at the higher level may include physical storage with higher access speed (for example SSD), while the storage 106-n at the lower level may include physical storage with lower access speed (for example magnetic storage device).

The storage management device 102 manages the storage environment 100, and may include one or more memories 108, one or more controllers 110 and/or other components. In some embodiments, the memory 108 includes a volatile memory and a non-volatile memory. In some embodiments, the storage management device 102 may be included in the storage device 106. In this case, the storage management device 102 may not include a separate memory 108 or controller 110, but use processing resources and storage resources of the storage 106-1 to 106-n included in the storage device 106.

The storage management device 102 can configure and manage the storage 106-1 to 106-n in the storage device 106. Specifically, the storage management device 102 can obtain an attribute, access information and the like of a file stored in the storage device 106 (for example the storage 106-2). The attribute of the file may indicate a size of the file or the like, and the access information may indicate an access frequency of the file or the like. The storage management device 102 can determine necessity of migrating the file based on a variety of factors, including the obtained attribute of the file, and the obtained access information, as well as a policy for dynamic adjustment, and the like. The storage management device 102 can select a most suitable data migration policy based on the necessity of migrating the file and current actual condition of the hierarchical storage system 100, thereby achieving efficient data migration between the storage at the different levels.

Those skilled in the art should understand that functions implemented in one module shown in FIG. 1 can be implemented in different modules and functions implemented in different modules can also be combined. For instance, the storage 106-1 may include a processing unit (not shown).

Those skilled in the art should further understand that the storage environment 100 shown in FIG. 1 is not simply hardware architecture, but may include hybrid architecture of hardware and signal processing. For example, the controller 110 can be implemented with software.

Figure 2:
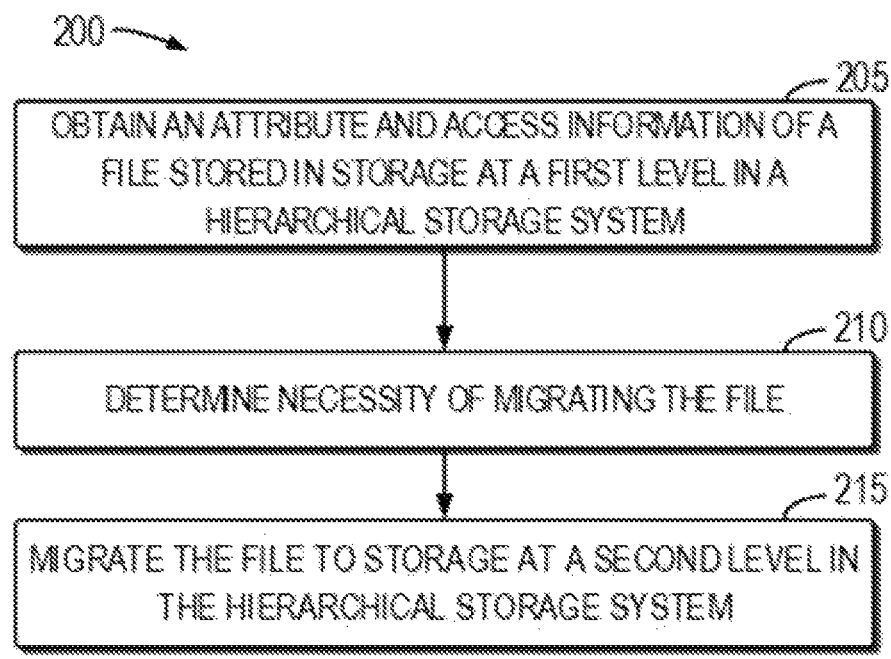
FIG. 2 illustrates a flow chart of a storage management method according to embodiments of the present disclosure.

Example embodiments of the present disclosure will be described in detail below with reference to FIGS. 2 to 4. FIG. 2 illustrates a flow chart of a storage management method 200 according to embodiments of the present disclosure. For instance, the method 200 can be performed by the storage management device 102 (more specifically, the controller 110 in the storage management device 102) as shown in FIG. 1. It is to be understood that the method 200 may further include additional steps not shown and/or the shown steps may be omitted. The scope of the present disclosure is not limited in this respect.

At 205, the storage management device 102 can obtain an attribute and access information of a file stored in storage at a first level (for example one of the storage 106-1 to 106-*n*) in the hierarchical storage system 100. For instance, as with the example shown above, the storage management device 102 can obtain the attribute and the access information of the file stored in storage 106-2.

In some embodiments, the storage management device 102 can obtain the attribute of the file and the access information from an index list file stored in the storage device 106 (for example the storage 106-1 at the first level). In some embodiments, the storage management device 102 can obtain the attribute of the file and the access information periodically based on a predetermined time interval. In some embodiments, the storage management device 102 can determine a frequency of access to the hierarchical storage system 100. In other embodiments, the storage management device 102 can determine a time interval based on the frequency of the access, and obtain the attribute of the file and the access information periodically based on the time interval. In this way, the time interval for obtaining can be adjusted according to the access frequency of the file of the hierarchical storage system 100, in order to reflect the latest attribute of the file and the latest access information.

In some embodiments, the attribute of the file indicates a static attribute of the file, such as a size of the file or the number of users accessing the file. In some embodiments, the attribute of the file further indicates a dynamic mode of the file, such as the number of times of access to the file. In some embodiments, the access information indicates, for instance, an access frequency of the file, a time point when the file is most recently accessed, a time point when the file is most recently modified, access bandwidth, read/write access ratio, block input/output density. In some embodiments, the storage management device 102 can obtain the a time point when the file is most recently accessed and the a time point when the file is most recently modified by reading the file's own time attribute.

At 210, the storage management device 102 can determine necessity of migrating the file based on the attribute of the file and the access information obtained at 205. The necessity of migrating the file can indicate a degree of necessity of migrating the file between storage at different levels (for example the storage 106-1 to 106-*n*). In some embodiments, the storage management device 102 can determine the necessity of migrating the file (for example from the storage 106-2 to 106-1) based on, for instance, the size of the file, the access frequency of the file, the a time point when the file is most recently accessed, the a time point when the file is most recently modified, the number of users accessing the file and the number of times of access to the file as mentioned above.

In some embodiments, the access frequency of the file, the a time point when the file is most recently accessed, the a time point when the file is most recently modified, the number of users accessing the file and the number of times of access to the file and the like as mentioned above can be stored in the index list file stored in storage device 106. The storage management device 102 can obtain the above information by reading the index list file.

In some embodiments, the necessity of migrating the file may depend on a necessity factor and a storage level at which the file is currently stored. The necessity factor, for instance, indicates a level that is more suitable for the file to be stored.

As an example, the necessity factor M for migrating the file x can be determined according to the following equation:

$$M(x) = (1/t-t0) * C * \sum_{i=1}^{N}(\lambda_w W i + \lambda_r R i) * 1/S \qquad (1)$$

where t represents the current time, t0 represents one of the a time point when the file is most recently accessed and the a time point when the file is most recently modified that is closest to the current time. C represents the number of users accessing file x. N represents the number of time blocks for obtaining. Wi and Ri represent the number of times of writing and reading the file in a time block, respectively. In other words, Wi and Ri represent writing and reading frequencies of the file, respectively. $\lambda_w$ and $\lambda_r$ represent compensating factors for writing and reading, respectively. S represents the size of the file. Equation (1) will be described below.

The smaller the length of time (t−t0) from the a time point when the file is most recently accessed or the a time point when the file is most recently modified t0 to the current time t is, the greater the necessity of migrating the file from the storage at the lower level (for example the storage 106-2) to the storage at the higher level (for example the storage 106-1) may be. In this way, both the cases that the file being accessed and modified are considered, instead of only the case that the file being modified being considered.

If frequencies of writing and reading operations for the file are high, it means that the file is accessed with high frequency. Therefore, the higher the frequency of the file being accessed is, the greater the necessity of migrating the file from the storage at the lower level (for example the storage 106-2) to the storage at the higher level (for example the storage 106-1) may be. The compensating factors $\lambda_w$ and $\lambda_r$ for writing and reading operations indicate the weights for the writing and reading operations at that storage level. In other words, $\lambda_w$ and $\lambda_r$ can indicate which of the writing and reading operations is attached with more importance in determining the necessity of migrating the file x. $\lambda_w$ and $\lambda_r$ can be determined in advance for the utilizing conditions of the hierarchical storage system.

The greater the number C of users accessing file x is, the greater the necessity of migrating the file from the storage at the lower level to the storage at the higher level may be. By using this variable, more users are taken into account, rather than only demands of a few users for accessing the file being taken into account.

The storage at the higher level is more suitable for storing files that are smaller and more likely to be accessed, which can prevent as much as possible ultra large files from being migrated to the storage at the higher level and thus occupying too much space of the storage at the higher level. Alternatively, accessing the files in the storage at the lower level directly by client 104 is more efficient. In some embodiments, 8 KB may be set as a unit of the size of the file, while S is determined as the number of units of the size of the file contained in the file.

It should be noted that above Equation (1) is only an example, and other ways specifying the variables and relations between the variables can be easily contemplated, which falls into in the scope of the present disclosure.

In some embodiments, except the necessity factors determined according to Equation (1), other factors can be taken into account to determine the final migration necessity. For instance, a storage level at which the file is currently stored can be taken into consideration. Specifically, if the storage level corresponding to the necessity factor of the file is the same as the storage level at which the file is currently stored, the necessity of migrating the file is determined to be low. In contrast, if the storage level corresponding to the necessity factor of the file is different from the storage level at which the file is currently stored, the necessity of migrating the file is determined to be high.

In some embodiments, the storage management device 102 can determine a type of the file from the above attribute of the file, and further determine the necessity of migrating the file further based on the type of the file, which allows the type of the file to be considered in determining the necessity of migrating the file. For instance, an administrator of the hierarchical storage system 100 can set a priority of migrating files of certain types. For example, the necessity of migrating files of these types can be set directly. For example, the administrator of the hierarchical storage system 100 can set video files (for example files of .avi type) to a low priority, and thus the necessity of migrating files of this type is set to low.

At 215, in response to the necessity exceeding the predetermined threshold, the storage management device 102 can migrate the file to the storage at the second level (for example the storage 106-1) in the hierarchical storage system 100. The first level (for example the storage 106-2) can be different from the second level. For example, in some embodiments, the storage management device 102 can determine, based on the necessity of migrating the file and a predetermined threshold for storage at a different level (one of the storage 106-1 to 106-*n*), the storage at the second level to which the file is to be migrated (for example another one of the storage 106-1 to 106-*n*). Specifically, the storage management device 102 can determine, based on the necessity factor M corresponding to the necessity of migrating the file as mentioned above and the predetermined threshold for the storage at the different level, the storage at the second level to which the file is to be migrated. For example, in response to the necessity factor M of migrating the file x exceeding the predetermined threshold for the storage 106-1, the storage management device 102 can migrate the file x from the storage 106-2 to the storage 106-1. As another example, in response to the necessity factor M of migrating the file x in the storage 106-1 being lower than the predetermined threshold for the storage 106-1, the storage management device 102 can migrate the file x from the storage 106-1 to the storage 106-2. As yet another example, in response to the necessity factor M of migrating the file x in the storage 106-2 being lower than the predetermined threshold set for the storage 106-1 but not lower than the predetermined threshold set for the storage 106-2, the storage management device 102 can maintain the file x in the storage 106-2 without migrating.

Alternatively, in some embodiments, the storage management device 102 can determine, based on the necessity of migrating the file, a rank of the file among a plurality of files stored in the hierarchical storage system 100, and determine, based on the rank, the storage at the second level to which the file is to be migrated (for example one of the storage 106-1 to 106-*n*). For instance, the storage management device 102 can migrate files with the necessity factors M corresponding to their necessity ranking top 10% among all the files to the storage 106-1, while migrating files with the necessity factors M corresponding to their necessity ranking 10%-20% among all the files to the storage 106-2, and so on.

By means of the method 200, a hit rate for the files in accessing the storage at the higher level can be increased by precise determination of files that are very likely to be accessed. Furthermore, in consideration of the various factors of migrating the files between the storage of different levels, only the desirable files are migrated, thus avoiding unnecessary file migration. This reduces response time in the hierarchical storage system 100 and improves speed of accessing the files.

Figure 3:
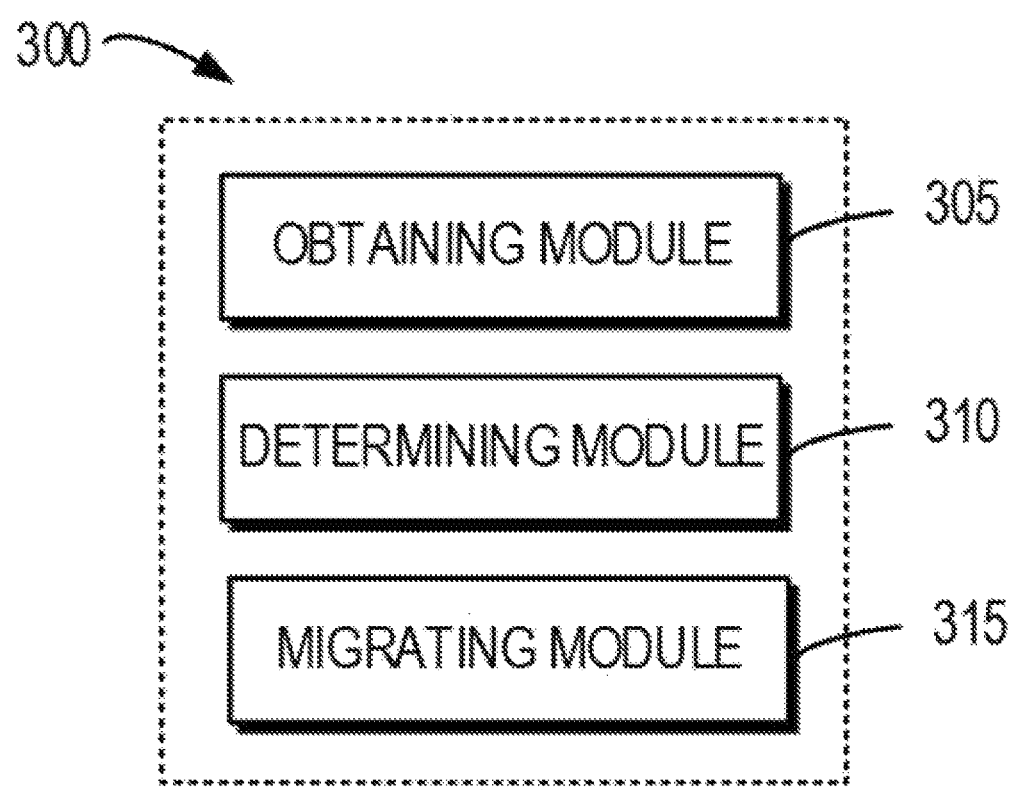
FIG. 3 illustrates a diagram of a storage management apparatus according to embodiments of the present disclosure.

FIG. 3 illustrates a block diagram of a storage management apparatus 300 according to embodiments of the present disclosure. The storage management device 102 shown in FIG. 1 can be implemented in part by the apparatus 300. For instance, the apparatus 300 can be implemented in the storage management device 102 or act as the storage management device 102.

As shown in FIG. 3, the apparatus 300 may include an obtaining module 305, a determining module 310 and a migrating module 315. The obtaining module 305 is configured to obtain an attribute and access information of a file stored in storage at a first level in a hierarchical storage system. The attribute of the file can indicate a size of the file, and the access information can indicate an access frequency of the file. The determining module 310 is configured to determine necessity of migrating the file based on the attribute of the file and the access information. The migrating module 315 is configured to, in response to the necessity exceeding a predetermined threshold, migrate the file to storage at a second level in the hierarchical storage system. The second level is different from the first level.

Alternatively or additionally, in some embodiments, the access information further indicates at least one of: a time point when the file is most recently accessed, a time point when the file is most recently modified, the number of users accessing the file, and the number of times of access to the file.

Alternatively or additionally, in some embodiments, the determining module 310 can be further configured to determine a type of the file from the attribute of the file; and determine the necessity of migrating the file further based on the type of the file.

Alternatively or additionally, in some embodiments, the migrating module 315 can be further configured to determine, based on the necessity of migrating the file and a predetermined threshold for storage at a different level, the storage at the second level to which the file is to be migrated.

Alternatively or additionally, in some embodiments, the migrating module 315 can be further configured to determine, based on the necessity of migrating the file, a rank of the file among a plurality of files stored in the hierarchical storage system; and determine, based on the rank, the storage at the second level to which the file is to be migrated.

Alternatively or additionally, in some embodiments, the obtaining module 305 can be further configured to determine a frequency of access to the hierarchical storage system, determine a time interval based on the frequency of the access, and obtain the attribute of the file and the access information periodically based on the time interval.

Figure 4:
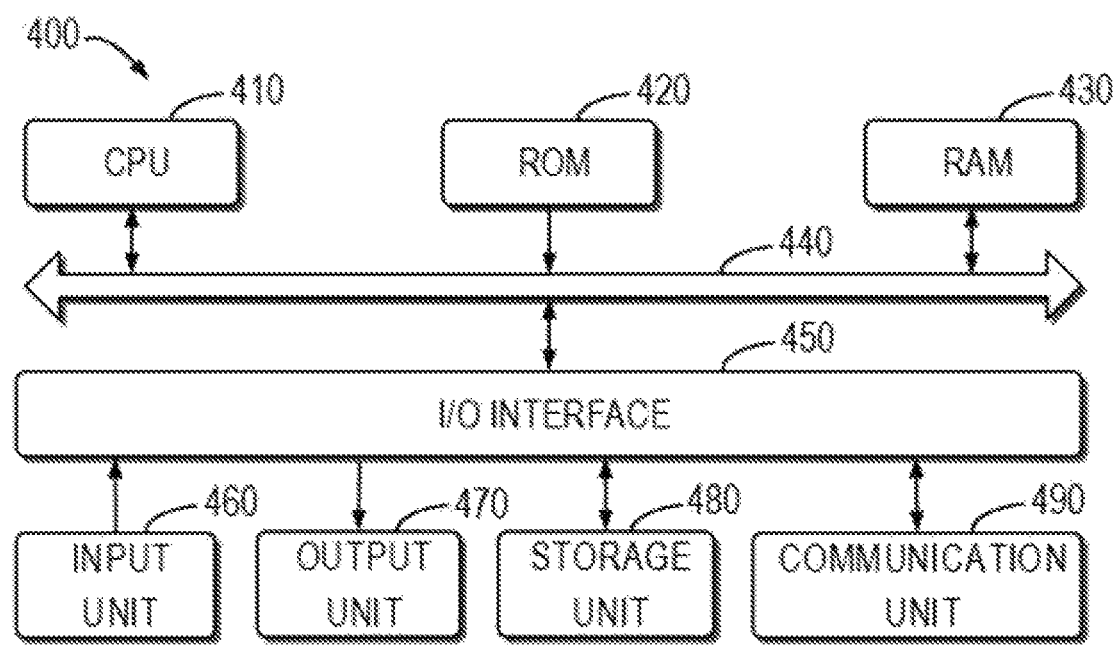
FIG. 4 illustrates a diagram of a storage management device according to embodiments of the present disclosure.

FIG. 4 is a schematic block diagram of an example device 400 for implementing embodiments of the present disclosure. As indicated, the device 400 comprises a central processing unit (CPU) 401, which can execute various appropriate actions and processing based on the computer program instructions stored in a read-only memory (ROM) 402 or the computer program instructions loaded into a random access memory (RAM) 403 from a storage unit 408. The RAM 403 also stores all kinds of programs and data required by operating the storage device 400. CPU 401, ROM 402 and RAM 403 are connected to each other via a bus 404, to which an input/output (I/O) interface 405 is also connected.

A plurality of components in the device 400 is connected to the I/O interface 405, comprising: an input unit 406, such as keyboard, mouse and the like; an output unit 407, such as various types of display, loudspeakers and the like; a storage unit 408, such as magnetic disk, optical disk and the like; and a communication unit 409, such as network card, modem, wireless communication transceiver and the like. The communication unit 409 allows the device 400 allows the device 400 to exchange information/data with other devices through computer networks such as Internet and/or various telecommunication networks.

Each procedure and processing described above, such as method 200, can be executed by a processing unit 401. For example, in some embodiments, the method 200 can be implemented as computer software programs, which are tangibly included in a machine-readable medium, such as storage unit 408. In some embodiments, the computer program can be partially or completely loaded and/or installed to the device 400 via ROM 402 and/or the communication unit 409. When the computer program is loaded to RAM 403 and executed by CPU 401, one or more steps of the above described method 200 are implemented. Alternatively, CPU 401 can also be configured to execute the above described method 200 via any suitable manners (such as by means of firmware).

The present disclosure may be a method, a device, a system and/or a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example electrical storage devices, magnetic storage devices, optical storage devices, electromagnetic storage devices, semiconductor storage devices or any random appropriate combinations thereof. More specific examples (non-exhaustive list) of the computer-readable storage medium comprise: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages comprising object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiment of the present disclosure has been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aim to best explain principle, actual application or technical improvement in the market of each embodiment or make each embodiment disclosed in the text comprehensible for those ordinary skilled in the art.

We claim:

1. A storage management method, comprising:
    obtaining an attribute and access information of a file stored in storage at a first level in a hierarchical storage system, the attribute of the file indicating a size of the file, and the access information indicating an access frequency of the file;
    determining necessity of migrating the file based on the attribute of the file and the access information, wherein determining necessity of migrating the file based on the attribute of the file and the access information includes determining a necessity factor for the file based upon, at least in part, the number of users accessing the file, wherein the necessity factor indicates a level that is more suitable for the file to be stored, the level that is more suitable being a determination of greater necessity of migrating the file for storage at the first level and at a second level, respectively, wherein a storage level corresponding to the necessity factor for the file is the same as a storage level at which the file is currently stored, the necessity of migrating the file is determined to be low; and
    in response to the necessity exceeding a predetermined threshold, migrating the file to storage at the second level in the hierarchical storage system, the second level being different from the first level.

2. The method according to claim 1, wherein the access information further indicates at least one of: a time point when the file is most recently accessed, a time point when the file is most recently modified, and the number of times of access to the file.

3. The method according to claim 1, wherein the determining necessity of migrating the file comprises:
    determining a type of the file from the attribute of the file; and
    determining the necessity of migrating the file further based on the type of the file.

4. The method according to claim 1, wherein the migrating the file comprises:
    determining, based on the necessity of migrating the file and a predetermined threshold for storage at a different level, the storage at the second level to which the file is to be migrated.

5. The method according to claim 1, wherein the migrating the file comprises:
    determining, based on the necessity of migrating the file, a rank of the file among a plurality of files stored in the hierarchical storage system; and
    determining, based on the rank, the storage at the second level to which the file is to be migrated.

6. The method according to claim 1, wherein the obtaining an attribute and access information of a file comprises:
    determining a frequency of access to the hierarchical storage system;
    determining a time interval based on the frequency of the access; and
    obtaining the attribute of the file and the access information periodically based on the time interval.

7. An electronic device, comprising:
    at least one processing unit; and
    at least one memory coupled to the at least one processing unit and storing machine executable instructions, the instructions, when executed by the at least one processing unit, cause the at least one processing unit to be configured to:
        obtain an attribute and access information of a file stored in storage at a first level in a hierarchical storage system, the attribute of the file indicating a size of the file, and the access information indicating an access frequency of the file;
        determine necessity of migrating the file based on the attribute of the file and the access information, wherein determining necessity of migrating the file based on the attribute of the file and the access information includes determining a necessity factor for the file based upon, at least in part, the number of users accessing the file, wherein the necessity factor indicates a level that is more suitable for the file to be stored, the level that is more suitable being a determination of greater necessity of migrating the file for storage at the first level and at a second level, respectively, wherein if a storage level corresponding to the necessity factor for the file is the same as a storage level at which the file is currently stored, the necessity of migrating the file is determined to be low; and
        in response to the necessity exceeding a predetermined threshold, migrate the file to storage at the second level in the hierarchical storage system, the second level being different from the first level.

8. The device according to claim 7, wherein the access information further indicates at least one of: a time point when the file is most recently accessed, a time point when the file is most recently modified, and the number of times of access to the file.

9. The device according to claim 7, wherein the at least one processing unit is configured to:
   determine a type of the file from the attribute of the file; and
   determining the necessity of migrating the file further based on the type of the file.

10. The device according to claim 7, wherein the at least one processing unit is configured to:
    determine, based on the necessity of migrating the file and a predetermined threshold for storage at a different level, the storage at the second level to which the file is to be migrated.

11. The device according to claim 7, wherein the at least one processing unit is configured to:
    determine, based on the necessity of migrating the file, a rank of the file among a plurality of files stored in the hierarchical storage system; and
    determine, based on the rank, the storage at the second level to which the file is to be migrated.

12. The device according to claim 7, wherein the at least one processing unit is configured to:
    determine a frequency of access to the hierarchical storage system;
    determine a time interval based on the frequency of the access; and
    obtain the attribute of the file and the access information periodically based on the time interval.

13. A computer program product for storage management, the computer program product comprising:
    a non-transitory computer readable medium encoded with computer-executable program code for indicating the search result, wherein the code is configured to enable the execution of:
      obtaining an attribute and access information of a file stored in storage at a first level in a hierarchical storage system, the attribute of the file indicating a size of the file, and the access information indicating an access frequency of the file;
      determining necessity of migrating the file based on the attribute of the file and the access information, wherein determining necessity of migrating the file based on the attribute of the file and the access information includes determining a necessity factor for the file based upon, at least in part, the number of users accessing the file, wherein the necessity factor indicates a level that is more suitable for the file to be stored, the level that is more suitable being a determination of greater necessity of migrating the file for storage at the first level and at a second level, respectively, wherein if a storage level corresponding to the necessity factor for the file is the same as a storage level at which the file is currently stored, the necessity of migrating the file is determined to be low; and
      in response to the necessity exceeding a predetermined threshold, migrating the file to storage at the second level in the hierarchical storage system, the second level being different from the first level.

14. The computer program product according to claim 13, wherein the access information further indicates at least one of: a time point when the file is most recently accessed, a time point when the file is most recently modified, and the number of times of access to the file.

15. The computer program product according to claim 13, wherein the determining necessity of migrating the file comprises:
    determining a type of the file from the attribute of the file; and
    determining the necessity of migrating the file further based on the type of the file.

16. The computer program product according to claim 13, wherein the migrating the file comprises:
    determining, based on the necessity of migrating the file and a predetermined threshold for storage at a different level, the storage at the second level to which the file is to be migrated.

17. The computer program product according to claim 13, wherein the migrating the file comprises:
    determining, based on the necessity of migrating the file, a rank of the file among a plurality of files stored in the hierarchical storage system; and
    determining, based on the rank, the storage at the second level to which the file is to be migrated.

18. The computer program product according to claim 13, wherein the obtaining an attribute and access information of a file comprises:
    determining a frequency of access to the hierarchical storage system;
    determining a time interval based on the frequency of the access; and
    obtaining the attribute of the file and the access information periodically based on the time interval.

* * * * *